Figure 1:
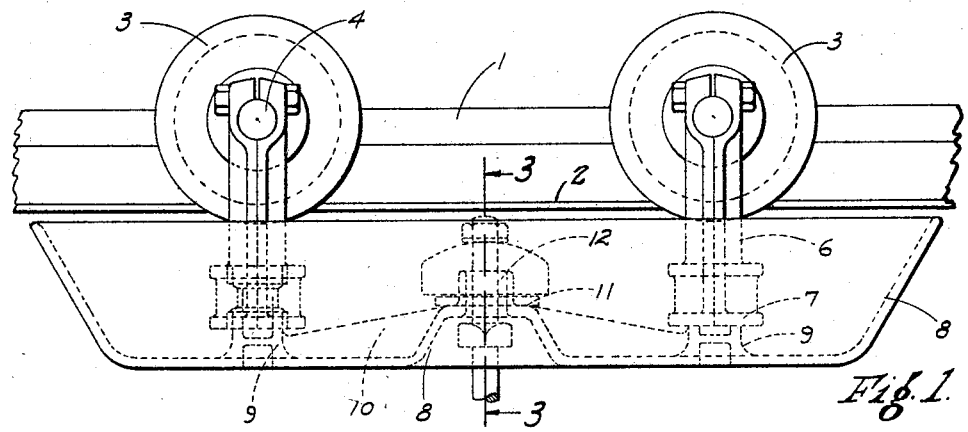

Aug. 2, 1932.                F. C. HARRIS                1,869,422
                          DRIP FRAME TROLLEY
                     Filed Nov. 22, 1930         3 Sheets-Sheet 1

Inventor
FRANK C. HARRIS.
By Richey & Watts
Attorney

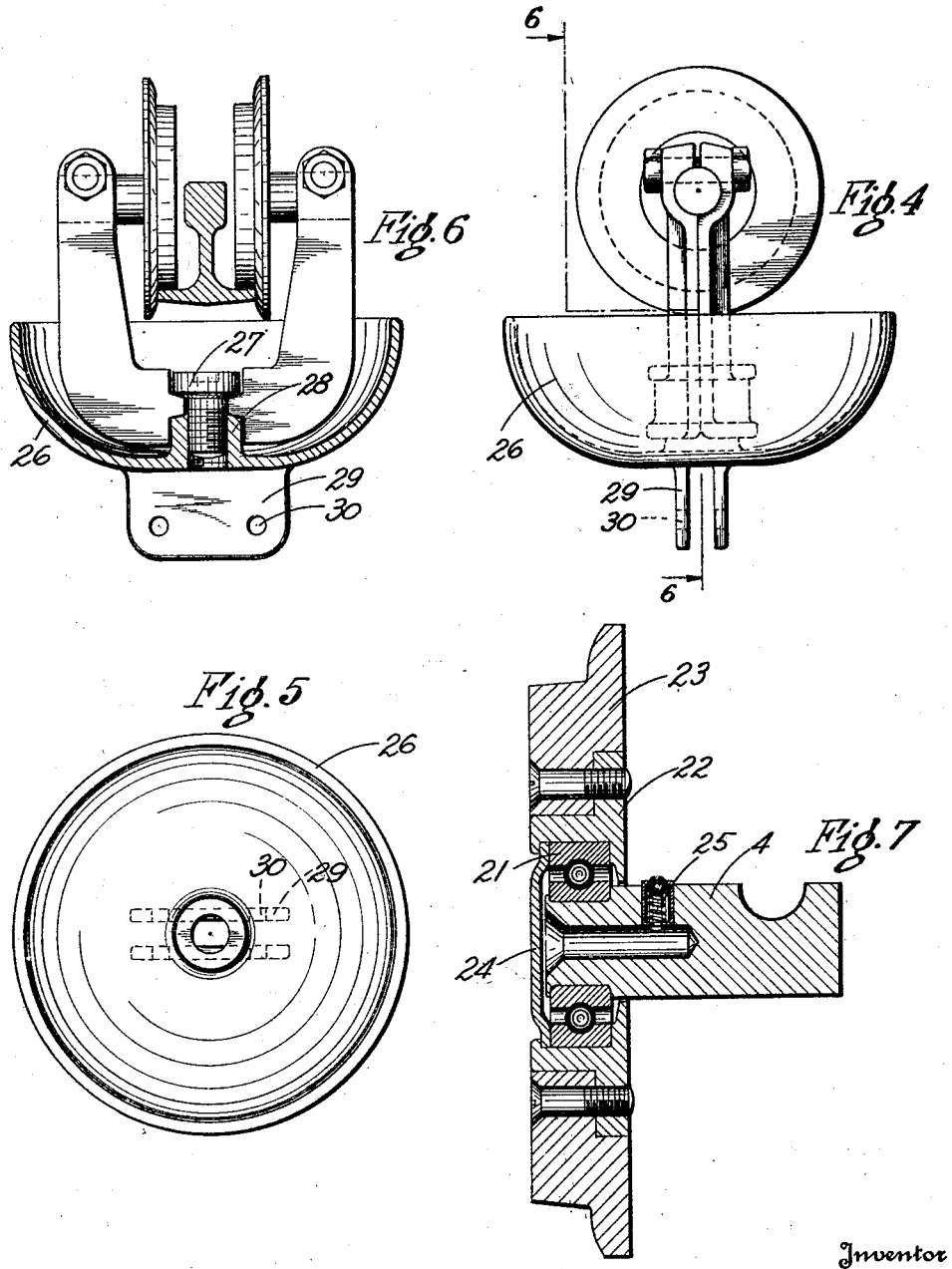

Aug. 2, 1932.  F. C. HARRIS  1,869,422
DRIP FRAME TROLLEY
Filed Nov. 22, 1930  3 Sheets-Sheet 3

Inventor
FRANK C. HARRIS.
By Richey & Watts
Attorney

Patented Aug. 2, 1932

1,869,422

UNITED STATES PATENT OFFICE

FRANK C. HARRIS, OF CLEVELAND, OHIO, ASSIGNOR TO THE AMERICAN MONORAIL COMPANY, A CORPORATION OF OHIO

DRIP FRAME TROLLEY

Application filed November 22, 1930. Serial No. 497,520.

This invention relates to overhead conveyor systems and more particularly to the trolley and frame construction of such systems.

Heretofore overhead or suspended single rail conveyor systems have included the usual rail with opposed flanges on which wheels were mounted to travel, the wheels being joined together by yokes and, where more than one pair of wheels were used as a unit to constitute a trolley, the yokes have been connected together by a frame or suitable load carrying member which in turn supported the load to be conveyed on the conveyor system. The usual trolley and frame construction in use prior to my invention has not taken into account, so far as I am aware, the fact that loose particles of dust and dirt from the rail, oil, liquids or metallic particles from the wheels and similar material from the trolley frame would fall onto the load being conveyed on the system. In certain industries, for example, in food and chemical plants it is often desirable, if not imperative, that all such foreign material should be prevented, as far as possible, from falling from the conveyor system onto the work being transported thereon.

According to the present invention, means have been provided for collecting such foreign material as might fall from the rail, the wheels, and in general from the trolley proper onto the transported load, the means particularly illustrated herein serving to collect such materials before they can reach the load that is being transported by the system.

Figure 2:
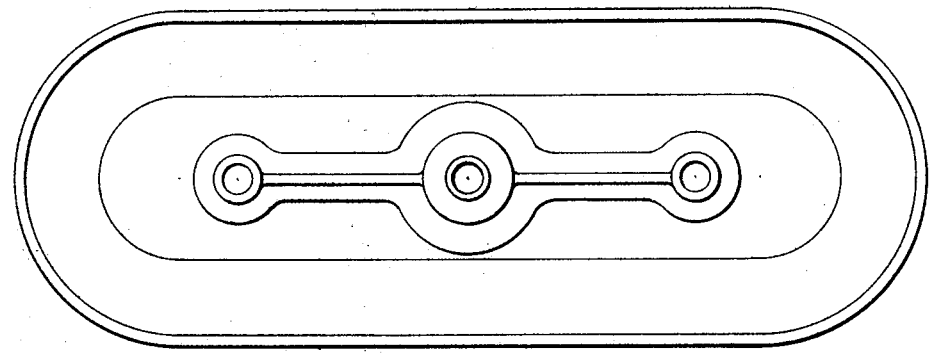
Figure 3:
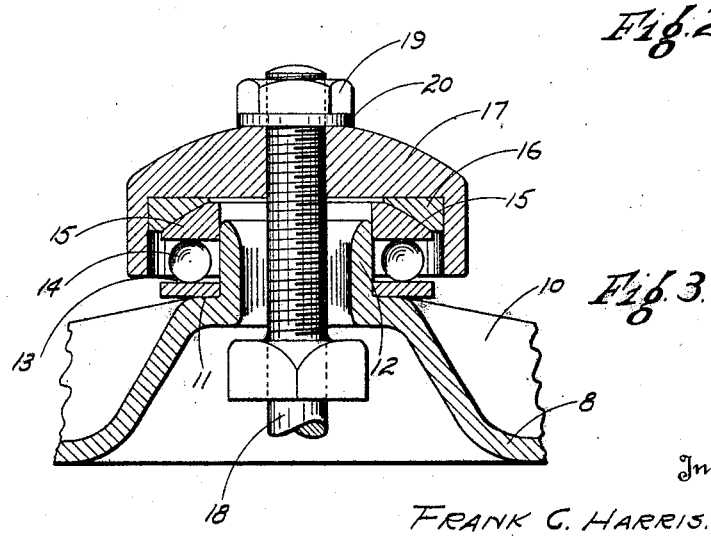

In the drawings accompanying and forming a part of this specification:

Fig. 1 is a side elevational view of one form of apparatus embodying the present invention, Fig. 2 is a top plan view of the trolley frame shown in Fig. 1, Fig. 3 is a transverse sectional view taken on line 3—3 of Fig. 1 and showing one form of attachment between the trolley frame and a load supporting means associated therewith, Fig. 4 is a side view of a single trolley construction embodying the present invention, Fig. 5 is a top plan view of the dirt collecting member of Fig. 4, Fig. 6 is a sectional transverse view taken on line 6—6 of Fig. 4, and, Fig. 7 is a detail sectional view of one form of trolley wheel construction shown in the foregoing figures.

Figures 8, 9:
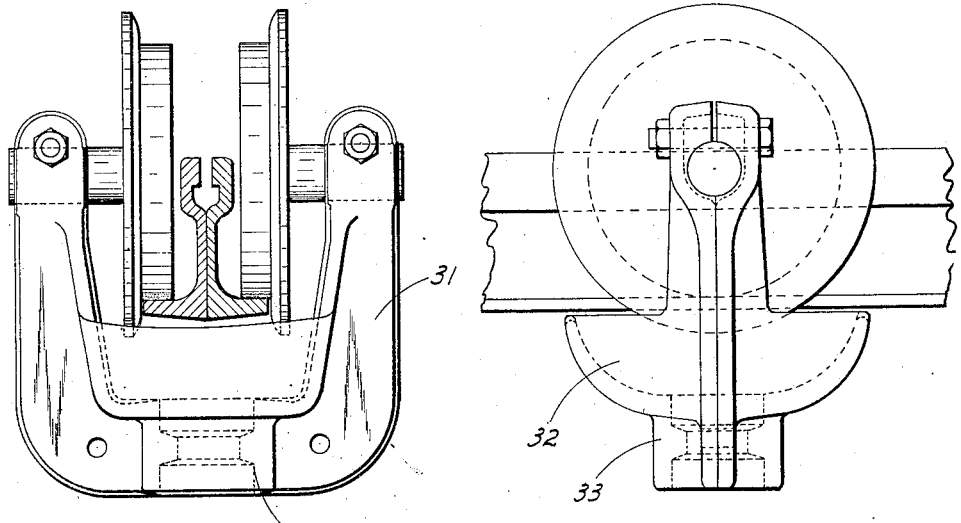
Figure 10:
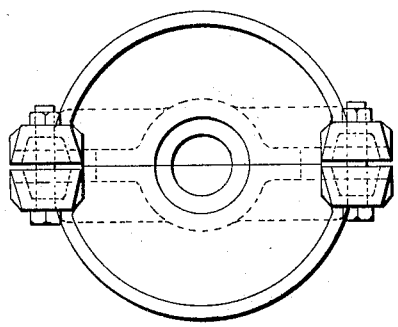

Fig. 8 is an end elevation partly in section showing a modified form of the invention, Fig. 9 is a side elevation of the trolley shown in Fig. 8, Fig. 10 is a top plan view of the trolley of Fig. 8.

Referring first to Figs. 1 to 3 inclusive, the rail 1 provided with two oppositely extending flanges 2 and suitably supported by brackets (not shown) carries two pairs of wheels 3, the details of which are shown more clearly in Fig. 7. Each wheel 3 is mounted on a non-rotatable shaft 4 and both shafts 4 of each pair of wheels are clamped between yoke members 6. Two wheels 3, constituting a pair, the shaft 4 of each wheel and the two yoke members 6 constitute a single trolley. The yokes 6 when assembled provide a swivel opening 7. The two trolleys of Fig. 1 are connected together by a trolley frame 8. This frame, as shown, is in the shape of a pan with the edges upturned so as to catch not only foreign material dislodged from the track, but also material falling from the wheels or yokes and to retain such material even though it be in the form of liquids such as oil and the like, and thereby prevent such material from falling onto the load carried by the frame. The frame 8 is provided with swivel heads 9 threaded into bosses on the frame and which are adapted to seat in the swivel openings 7 and be secured in swivel co-operation with the yokes 6 so that the yokes and frame may pivot relatively to each other. The frame 8 is provided, between the swivel heads 9, with means for supporting a member to which the load to be transported may be attached. The frame 8 is, for this purpose, provided with a raised bottom wall 10 formed with an annular plane surface 11 an upstanding marginal flange 12. As will appear more clearly by referring to Fig. 3, the surface 11 has seated thereon a bearing race 13 for ball bearings 14, the top race 15 being positioned by the flange 12 as also is the race 13. A complementary member 16 rests on the top race 15 and carries a member 17 to which the load carrying member 18 is secured. In the present instance, the member 18 takes the form of a rod provided with suitable load engaging means such as a hook (not shown) and at its upper end passes through the frame 8 within the flange 12 and is adjustably positioned on the member 17 by a jamb nut and lock washer 19 and 20 respectively.

Referring to Fig. 7 it will be seen that the shafts or axles 4 carry ball bearings and races indicated as an entirety by character 21. On the bearing 21 a hub 22 is mounted and has removably secured thereto a flanged ring 23 constituting a rim of the trolley wheel. A plate 24 serves to enclose the bearing 21 to prevent escape of oil, dirt, metallic particles and the like from the hub of the wheel. Lubricant supplied to the axle 4 as through the lubricant opening 25, after lubricating the bearing 21 may escape between the axle and the hub but any such escaping material will collect in the frame 8 because of its extension in all directions sufficiently far to intercept any such freely falling material.

Referring now to Figs. 4, 5, and 6, the wheels, axles and yokes of the preceding figures are the same as those of these figures. The yoke is provided with a foreign material collecting member 26, the manner of connection being shown in Fig. 6 where the member 26 is provided with an upwardly projecting boss 28 screw threaded and fitted with a headed screw 27 which is inserted between the members constituting the yoke in swiveling relation. The member 26 has depending ribs or flanges 29 provided with aligned openings 30 through which bolts or similar means may be inserted to constitute means for attachment of a load to the member 26.

Referring now to Figures 8, 9, and 10, I have shown a modified form of the invention wherein the wheels and axles are the same as those in the preceding figures. The yoke 31 has integrally formed therewith a material collecting pan 32. The yoke 31 is provided with the swivel opening 33 which is adapted to have seated thereon the headed end of a supporting rod (not shown). In this form of the invention it is possible to form the yoke and pan of a single casting thereby strengthening the trolley assembly by the use of a fewer number of isolated parts.

In all of the foregoing modifications, the trolley is provided with a member adapted to collect foreign materials falling from thereabove and to prevent such materials coming into contact with the load carried by the trolley.

Having thus described my invention so that those skilled in the art may understand and be adapted to practice the same, what I desire to secure by Letters Patent is defined in what is claimed, it being understood that the foregoing detailed description and specific forms illustrated have been disclosed merely for the purpose of describing my invention, it being further understood that various changes, not amounting to invention may be made in the illustrated apparatus without departing from the scope of the invention as hereinafter defined.

I claim:

1. A monorail trolley assembly including wheels and yoke means, the assembly including means disposed below the wheels to collect and retain falling refuse.

2. A monorail trolley assembly including wheels, yoke means, and means integrally formed with said yoke means for collecting and retaining falling refuse.

3. A monorail trolley assembly including wheels, yoke means, and load supporting means swiveled to the yoke means, said load supporting means adapted to collect and retain falling refuse.

4. A monorail trolley assembly including wheels, yoke means supported by said wheels, a load supporting means adapted to collect and retain falling refuse, a load bearing swivel on said supporting means comprising an upwardly extending support, a bearing seat on said support, a thrust bearing on said seat, and means for securing a load on said bearing.

5. A monorail trolley assembly including wheels, yoke means supported by said wheels, a load supporting means pivotally secured to said yoke means, and means integrally formed with said load supporting means adapted to collect and retain any falling refuse from said wheels.

6. A monorail trolley assembly including wheels, yoke means supported by said wheels, a load supporting means pivotally secured to said yoke means, and means integrally formed with said load supporting means adapted to collect and retain any falling refuse from said wheels.

7. A monorail trolley assembly including wheels, yoke means supported by said wheels, means pivotally secured to said yoke means adapted to collect and retain falling refuse, and means for supporting a load comprising a bearing swivel supported by said refuse collecting means.

8. A monorail trolley assembly including wheels, yoke means supported by said wheels, means pivotally secured to said yoke means adapted to collect and retain falling refuse, said means for supporting a load associated with said refuse collecting means and comprising a bearing seat, a thrust bearing on said seat, and a member encasing said thrust bearing and adapted to receive a load.

9. A monorail trolley assembly including wheels in combination with means for collecting falling material from said wheels.

10. A monorail trolley assembly including wheels, means for supporting a load from said wheels, and means for collecting and retaining falling material.

11. A monorail trolley assembly including wheels, means for supporting a load from said wheels, and means formed integrally with said supporting means for collecting and retaining falling material.

In testimony whereof I hereunto affix my signature this 19th day of November, 1930.

FRANK C. HARRIS.